INVENTORS
HORST THEILEMANN
KURT ZENKNER

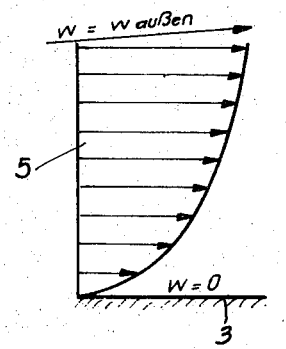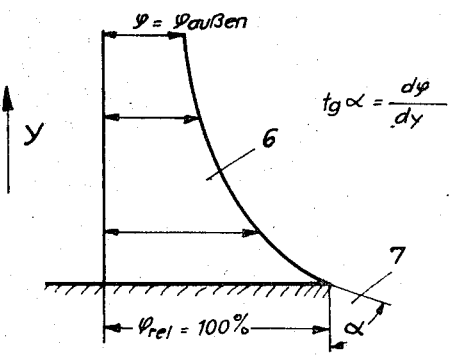
Fig. 4a   Fig. 4b
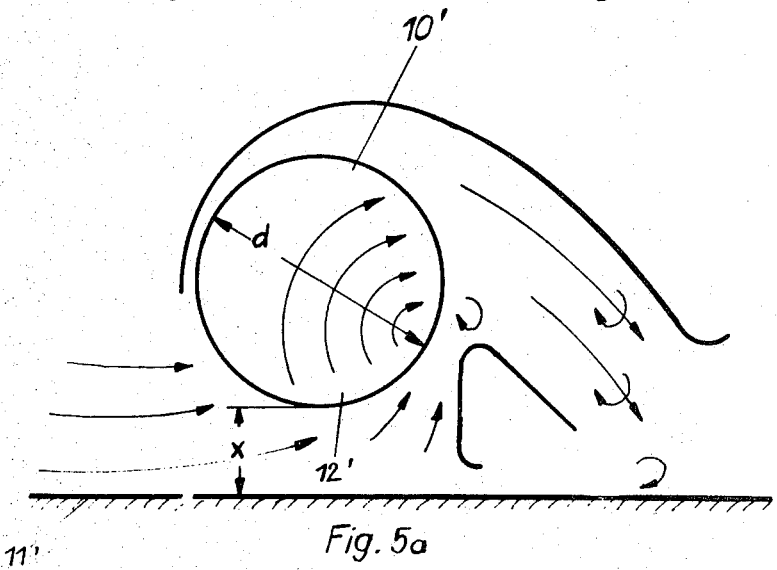
Fig. 5a
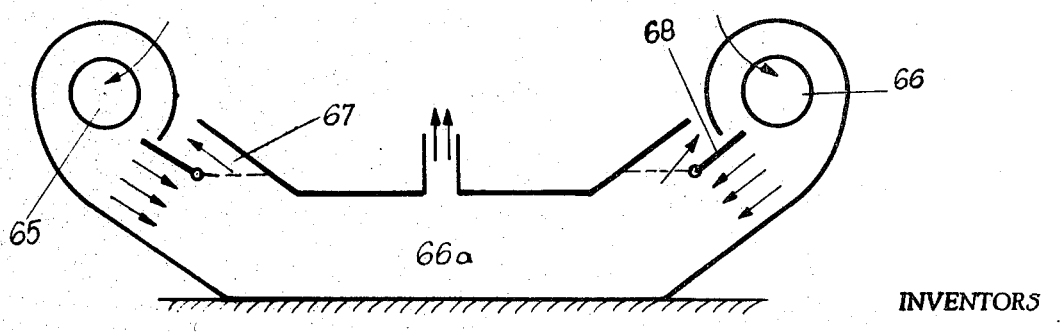
Fig. 12

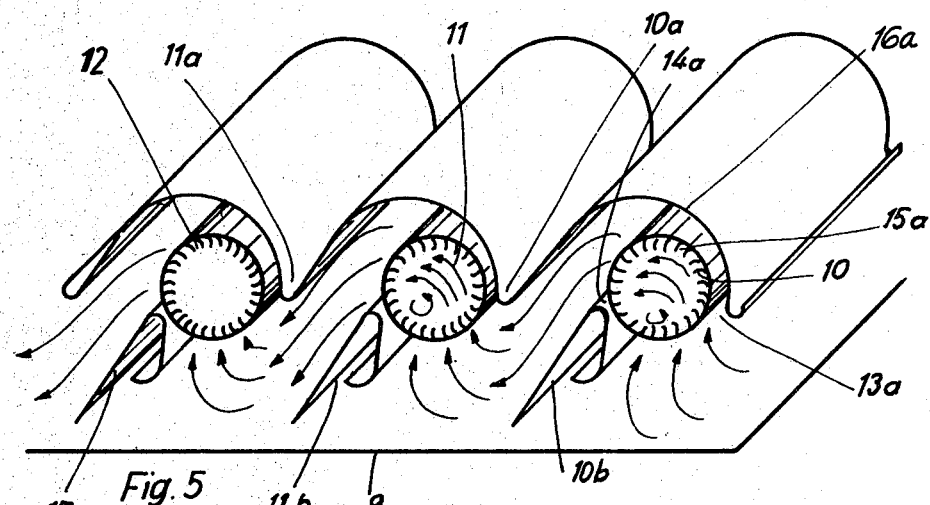
Fig. 5
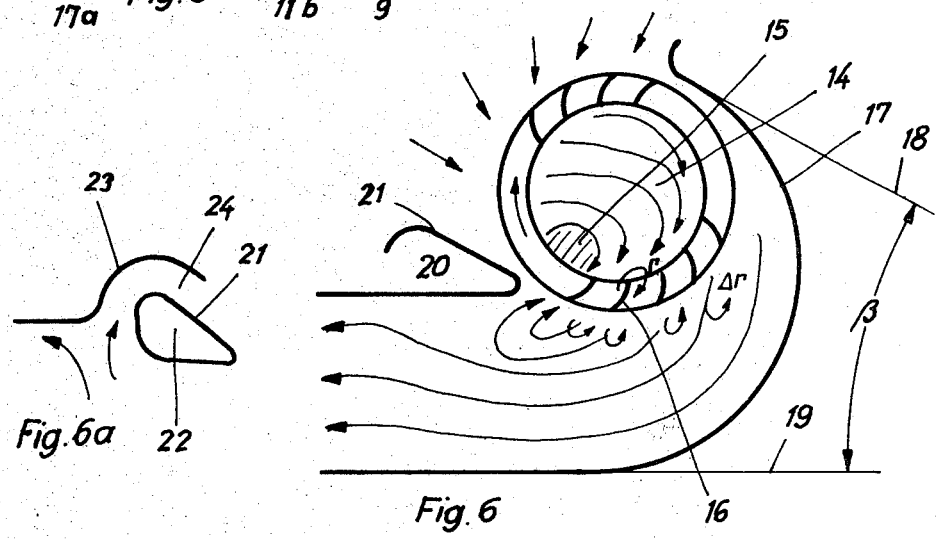
Fig. 6a
Fig. 6
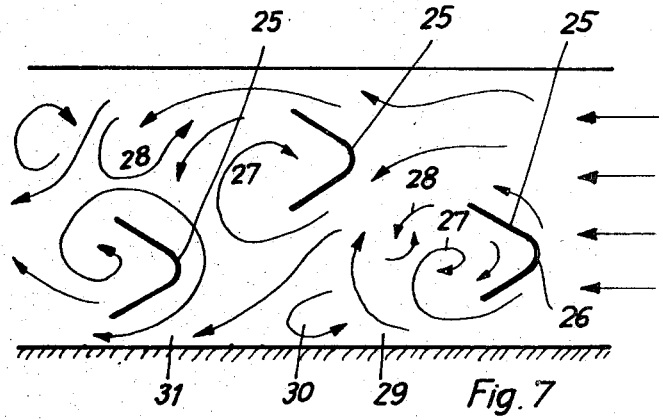
Fig. 7
INVENTORS
HORST THEILEMANN
KURT ZENKNER

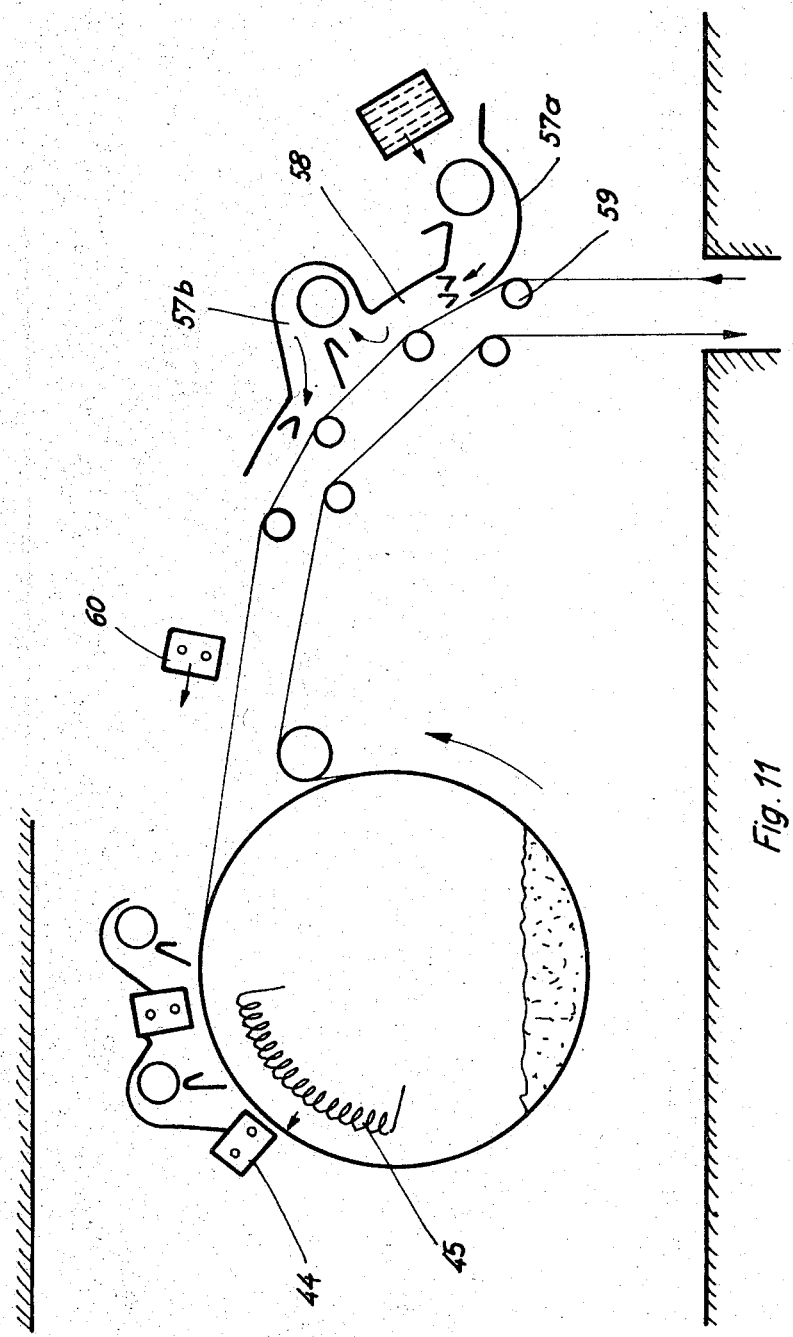

3,559,298
METHOD FOR DRYING OR HEATING OR COOLING A PROCESS MATERIAL AND A DEVICE FOR CONDUCTING SUCH METHOD
Horst Theilemann, Rudesheimer Strasse 11, Munich, Germany, and Kurt Zenkner, Hertzstrasse 12, Ettlingen, Germany
Filed Sept. 5, 1968, Ser. No. 757,635
Int. Cl. F26b 5/04
U.S. Cl. 34—15         14 Claims

ABSTRACT OF THE DISCLOSURE

A band or web of material or a layer of material carried on a band is treated by exposing the surface of the material while passing it through a treatment chamber to jets or a current of air, the jets impinging on the surface and forming a flow traveling along the surface of the material. The flow is repeatedly interrupted on its course and then reformed by producing an instability in the flow, as by the use of spoilers. The flow may be produced by cross-flow blowers with their axes parallel to the surface of the material, discharging directly into the surface of the material. The outlet of the blowers is varied by movable flaps.

---

Figure 1:
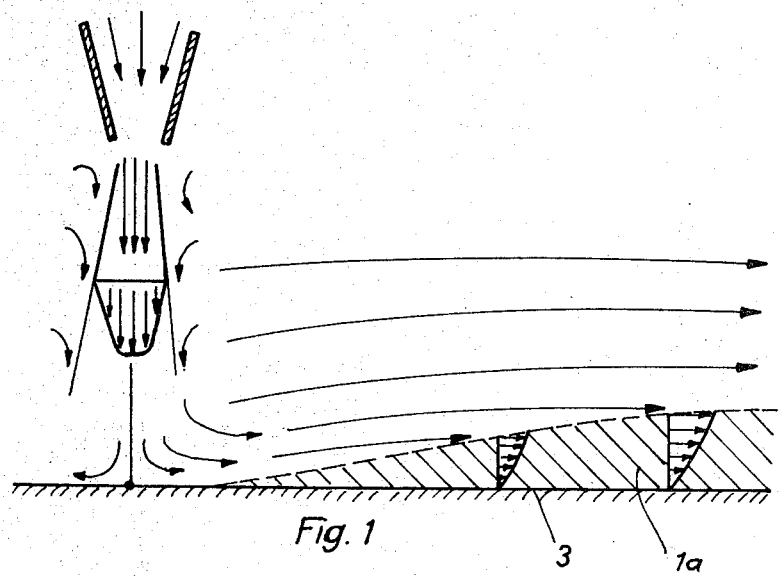

The present invention relates to a method for drying or heating or cooling a material to be process-treated in which the said process material in the form of a band web or cloth or a layer or film of uniform thickness resting on such a web, cloth or band, is passed through a treatment or processing chamber in which the surface of the said process material is exposed for a predetermined time to a current or jets of air.

Hitherto, jet or spray nozzles have been used for drying, heating or cooling a process material by which the process medium or agent is directed against the surface of the material being treated. In these, known methods the spray or jet issuing from such nozzles with a certain degree of acceleration, strikes the surface to be treated approximately at right angles, thus forming along the said surface a laminar flow with laminar stream lines, as a consequence whereof, powerful forces are brought to act in the stagnation point of the flow, in a manner deleterious for the material. In addition, the transfer of matter, of heat, etc., depends on the thickness of the boundary layer, which, of course, increases with the length of the flow; thus reducing the transfer of the material or the heat transfer. Such a stagnation flow, which is unavoidably formed when using the existing, so-called spray or nozzle driers, is therefore, highly disadvantageous for the purpose now in question.

The present invention has, on the contrary, the object of making the velocity-dependent boundary layer as thin as possible, in the realization that the transfer of material and heat depends on the thickness of the corresponding boundary layer, whether moisture-dependent or temperature-dependent; which in turn, depend directly on the thickness of the velocity-dependent boundary layer.

For this purpose, according to the present invention, an entirely new method is proposed, consisting in that the jets of air from the spray are allowed to impinge on the surface being treated and thereby cause the formation of a fluid flow along such surface; this flow being repeatedly interrupted in its course and allowed to re-form, e.g. by maintaining an unsteady development of the flow or introducing spoiler elements into the course of the flow. The most suitable procedure is on the one hand to break down the boundary layer forming in the flow of the medium along the surface of the process material; and on the other hand to set up a carrier flow through which an exchange of substance and heat can take place between the surface of the process material and the ambient space; the operation of forming and ensuing destruction of the boundary layer in the flow, being suitably divided into spatial and/or temporal sections or stages in cyclic sequence. For instance, the arrangement selected may be such that the air is blown on the process material to be dried in the form of an unsteady flow with powerfully spheroidal turbulence, such as to prevent the formation of a laminar flow on the surfaces of the process material.

In using this method according to the invention the length of travel of the flow along the surface being treated is kept short by repeatedly interrupting the flow and allowing it to re-form, varying the intensity and/or direction of the flow, or in any other suitable way for creating an unsteady behaviour of the flow by disturbances in its course, or spoiling means. As a consequence, the velocity-dependent boundary layer will be kept as thin as possible; whereby again the temperature-dependent and moisture-dependent boundary layer components likewise become very thin. Since a developed carrier flow is simultaneously present, moisture and heat are conveniently transferred or removed from the material. In the course of the researches preceding the development of the present invention, it was further found that the use of cross-flow blowers with their typical form of exit flow, and their arrangement in such manner that the discharge flow strikes directly on the process material and thus figuratively blows freely thereupon without the interposition of any nozzle, presents great advantages for the purpose herein contemplated. This is, moreover, obvious, since with the type of flow discharged by such a cross-flow blower, the formation of laminar flows on the surface of the material being dried, is reliably prevented; besides which, any local influencing forces, such as inevitably arise in the case of the so-called stagnation flow at least in the vicinity of the stagnation point, are absent. Contrary to the development of the flow from other blower types, the flow at the exit from a cross-flow blower is found to contain a great number of so-called "circulation-spoiling" vortices, producing a highly isentropic, spheroidal turbulence, a unilateral velocity distribution, no swirl and, eventually, a pronounced unsteady flow. Thus, the use of a cross-flow blower of the kind just described produces a kind of macro-turbulence, i.e. a turbulence in spheroidal vortices, the local rate of flunctuation being of the order of magnitude of the carrying speed of the flow, or even higher. Such macro-turbulence is insofar in contrast to the type of micro-turbulence developed by axial- or radial-flow blowers and which includes also the so-called isentropic turbulence, in which the rate of fluctuation is substantially lower than the speed of the carrier flow. For drying purposes, however, such macro-turbulence is most desirable, especially when associated with an unsteady flow, while micro-turbulence has practically no drying effect. In order to obtain a proper drying effect with a high degree of dryness, the manner in which the turbulence influences the boundary layer conditions, is decisive. It is just in this regard that macro-turbulence is incomparably more effective and important, than micro-turbulence.

The method according to the present invention can for instance be used for drying paper webs, plastic foils or plastic-coated papers, for cooling materials such as metal, steel or aluminum strip, cladded metal foils, etc. The method can also be used for heating the exchange surface, e.g. of strip or other continuously travelling material of any other kind. Besides this, the method according to the invention can usefully be applied to the drying of textiles, especially for very thick and impermeable goods, for treating coated or cladded wood panels (chipboard etc.), plaster tiles, ceramic goods, etc, or for drying paint coatings.

A device according to the invention for conducting this method is characterized in that it incorporates the use of a cross-flow blower directly acting without the interposition of nozzles or spray jets, on the surface of the process material, with its axis of rotation placed parallel to the surface of the material being treated, the part of the periphery whereof nearest to the surface of the process material being distant therefrom by not more than the equivalent of the diameter of the blower rotor, and suitably less. The arrangement can in such form consist of a suitable number of prefabricated units assembled in building block form and each containing in a casing on the side facing the surface of the process material a number of cross-flow blowers acting directly on the surface of the said process material without the intermediary of nozzles or spray jet the axes whereof are parallel with each other and with the surface of such process material, with an auxiliary blower maintaining the rotation of the system and having on the side remote from the surface of the process material a heat exchanger and wherein suitably an inlet for fresh air is arranged axially at one end and an outlet for spent air is arranged axially at the opposite end of the casing.

By means of this arrangement it is possible in a form of construction as nearly as possible suitable for mass production, to adapt such system to all possible conditions of application in the simplest possible manner.

These and other object, features, and advantages of the present invention will become further apparent from the following detailed description thereof, particularly when the same is read with reference to the accompanying drawings.

Figure 2:
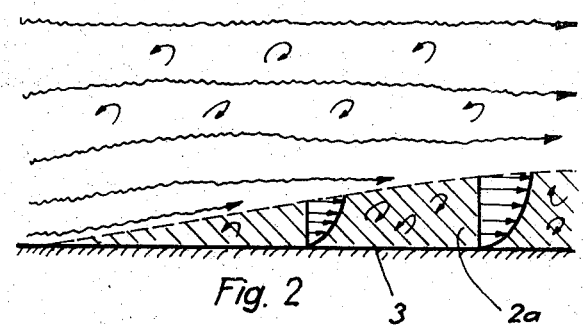
Figure 13:
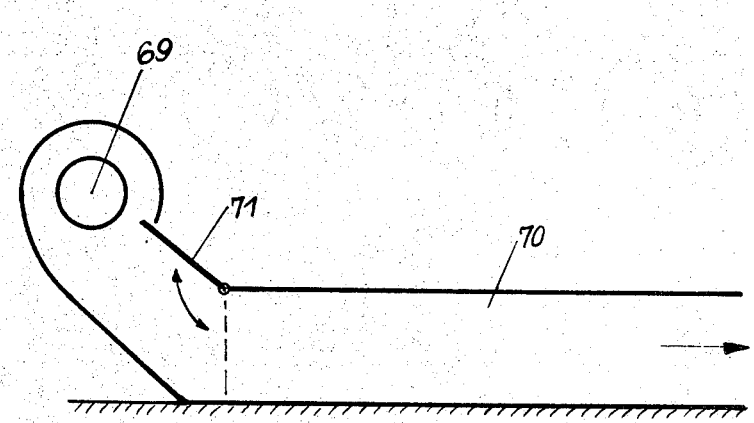
Figure 14:
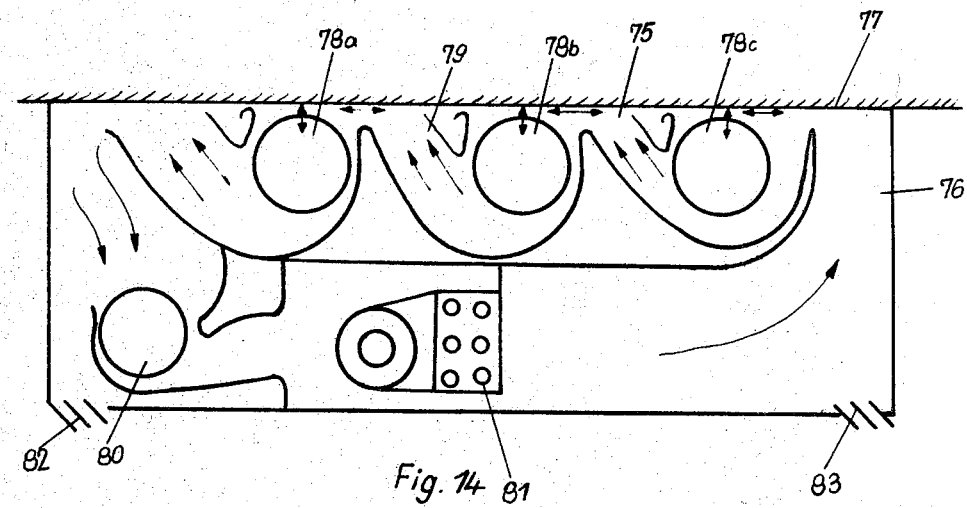

The attached drawing illustrates exemplary forms of embodiment of the object of the present invention, in particular:

FIGS. 1 and 2: in explanation of the guiding principles of the invention, diagrams of the development of the velocity-dependent boundary layer in the case of laminar and highly-turbulent outflow respctively; and, FIGS. 3a, 3b and 4a, 4b: the relationships between the laminar velocity-dependent boundary layer and the moisture-dependent boundary layer on the one hand, and the turbulent velocity dependent boundary layer and the turbulent moisture-dependent boundary layer on the other hand, each similarly in diagrammatic form;

FIG. 5: a first form of embodiment according to the invention in a partially-perspective front elevation;

FIG. 5a: a modified form of embodiment of the object of the invention in a diagrammatic side view;

FIGS. 6 and 6a: details of the arrangement according to FIG. 5 respectively a corresponding variant thereof, in a diagrammatic representation;

FIG. 7: a so-called turbulence channel for a device in accordance with the invention similarly in side view in diagrammatic form;

FIGS. 8, 9, 10 and 11: different forms of embodiment of devices in accordance with the invention each in side view in diagrammatic form; and FIGS. 12, 13 and 14: further modified forms of embodiment of the object of the invention each in side view in diagrammatic form.

Figure 3A:
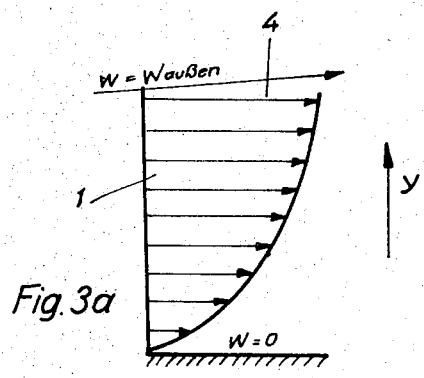
Figure 3B:
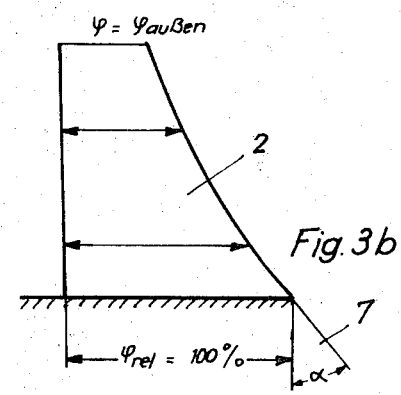
Figure 8:
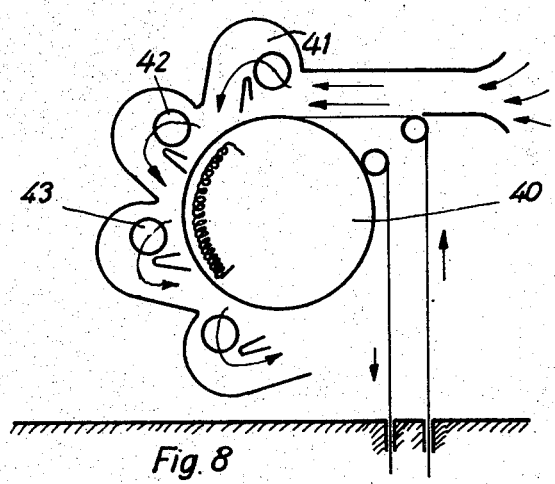

FIGS. 1 and 2 show the velocity-dependent boundary layer for laminar and highly-turbulent outflow respectively wherein the boundary layer is likewise laminar in the first case and turbulent in the second case. Herein, 3 is the liquid surface, whereas 1a and 2a respectively represent the boundary layer. FIGS. 3a, 3b show diagrammatically the relationship between the velocity-dependent boundary layer 1 and the moisture-dependent boundary layer 2. In the velocity boundary layer 1 the velocity increases from 0 at the liquid surface 3, to the value of the external flow at 4. In the moisture-dependent boundary layer 2, the peak value at the liquid surface 3 is found to be $\varphi_{rel}=100\%$ relative humidity, at the liquid surface 3, and sinking therefrom with the boundary layer, to the value of $\varphi$ corresponding to the external flow. The turbulent velocity boundary layer 5 is as shown in FIG. 4a, more convex than the profile shown in FIG. 3a, the corresponding moisture profile 6 (FIG. 4b) is flatter than the profile according to FIG. 4a. The gradient tan $\alpha$ of the starting tangent 7 is flatter in the laminar moisture profile than in the turbulent case. The value of this gradient is solely responsible for the moisture transfer between the liquid surface and the external flow.

FIG. 5 shows in a first form of embodiment of the method according to the invention, a series of cross-flow or transverse-flow blowers 10, 11, 12 in accordance with the invention. The blower units generating the jets directed on the surface to be dried, are arranged with their axes of rotation transversely to the direction of advance of the material to be dried and spaced at suitably variable intervals in sequence along the surface; they should with advantage extend over the whole width of the cloth or web to be dried. In accordance with the invention these cross-flow blower units are constructed as high-stability, cross-flow blowers each having a baffle or guide plate 16a extending in the direction of rotation of the blower from the entry 13a to the discharge from the blower 14a, in a sweeping curve to an increasing distance from the rotor 15a, the angle between the starting tangent 18 and the tangent 19 at the end (FIG. 6) being substantially less than 90° and most suitably between 30–60°, in association with a tapering tongue 17a or 20 respectively, with two legs enclosing an acute angle of suitably 20–60°, whereof the leg 21 on the suction side (FIG. 6) forms a duct between itself and the rotor blade cascade, widening in the direction of rotation. The flow through such a cross-flow blower is shown in FIG. 6. The flow enters along radial planes at right angles to the direction of rotation, and can thus be regarded as two-dimensional. In the interior 14 of the blower the flow is deflected round a vortex core 15, as shown by the arrows, the curvature of the streamlines increasing in the direction of the core. A velocity profile is thus formed, with a pronounced velocity peak near the core. Consequently, the rotor blades are likewise exposed to a higher flow velocity than prevailing in the external flow. Necessarily, the circulation Γ around the blades, is also increased. The variation in the circulation, ΔΓ therefore, is expressed by a circulation-spoiling vortex, which breaks away from the blade and floats. Hence, the jet directed by the blower on to the heat-exchange surface, contains a plurality of circulation-spoiling vortices, which are a component of the high turbulence developed in the jet. FIG. 6b shows a variant. This contains a vortex tongue, formed by a wedge-shaped solid body 22 and a vortex guiding plate 23. A gap 24 is left open between the parts 22 and 23, through which a high-energy slot flow is directed over the upper leg 21 of the wedge approximately tangentially towards the blower, which improves the efficiency of the blower.

In the arrangement according to FIG. 5 the entering drying air is drawn in by the blower rotor, and directed on the liquid surface, the next rotor picks it up there and directs it again on to the surface of the material to be dried. The following rotors act similarly, so that the flow, and consequently the boundary layer thereof, are each time interrupted. At the same time, each blower rotor, or each blower unit, approximately generates the pressure which is destroyed again between that blower rotor and the next unit in succession, by turbulence and friction. For this reason, the blower arrangement in question cannot be regarded as the equivalent of a multi-stage, cross-flow blower. In addition the guide plates or baffles of the successive cross-flow blowers, are interconnected, the outlet end of one blower unit being joined to the entry end of the next blower unit, forming together a corrugated guide surface extending parallel to the surface being dried, the hollow parts whereof most nearly adjoining the said surface, are located between the rotors of the successive blower units in the direction of advance of the process material, whereas the vortex tongues on the side of the rotors facing the surface of the process material are each fitted between the said rotors and always in front of the corresponding hollow in the guide plate in the direction of motion of the material. These hollows are indicated in FIG. 5 at $10a$, $11a$, and the vortex tongues at $10b$, $11b$. In the arrangement according to FIG. 5a, a cross-flow blower $10'$ is fitted, blowing directly and without intermediary of nozzles, on the surface $11'$ of the process material, the point $12'$ on the periphery thereof nearest to the surface of the process material being at a distance $x$ from the said surface, not greater than the diameter of the blower rotor, and suitably at a lesser distance. In such case, the outflow from the blower is so much disturbed, that the flow becomes unsteady.

A turbulence channel or duct (see FIG. 7) can be arranged between each two, successive blower units, contained between the surface to be dried and an adjacent, parallel wall part, and in which spoilers or flow obstructions 25 are arranged, distributed over the length and suitably also the width, of the said channel for the purpose of producing pairs of shedding vortices, suitably of triangular shape, the apex whereof 26 points upstream in the incident flow. These spoilers or obstructions 25 produce left- and right-handed, shedding vortices 27 and 28 respectively. These produce on the heat-exchange surface of the material to be dried, a flow 29 which breaks away from them unsteadily, and set up a reflux 30 which again rejoins the surface at 31. Thereby, each boundary layer is broken up in a short time, and thereafter reconstructed, producing a particularly effective exchange of moisture. The flow spoilers 25 in the aforesaid gap further ensure an effective distribution of the material in the boundary layer over the whole flow space, by creating the appropriate vortices.

The air jets discharged are directed obliquely to the surface of the material being dried, and can be inclined either against or with the direction of motion. This air can also be preheated before passing through the blowers, by which means it can be raised to increasingly high temperatures while the material is passing through the arrangement.

In accordance with the invention, in arrangements for drying long webs of material, films, paper webs, plastic or textile cloths, the web is in the principal part of the drying chamber laid around the periphery of a drying drum 40, cross-flow blower units 41, 42, 43 being arranged at equal intervals around the circumference of the drum 40, e.g. seven such units (FIG. 8), coacting to direct their air jets against the surface of the drum. The drum itself can be run at a uniform speed, in the direction of travel of the web, and can be heated (cf. 45 in FIG. 11). The blower units, between which heat-exchangers can suitably be arranged, are located approximately as shown in FIGS. 5 and 6.

Figure 9:
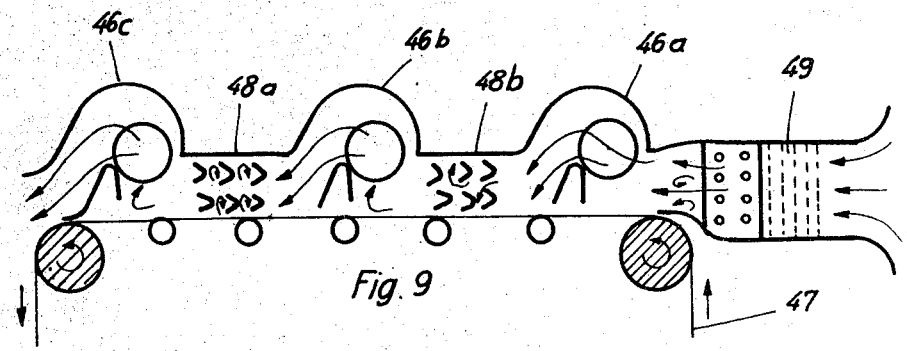
Figure 10:
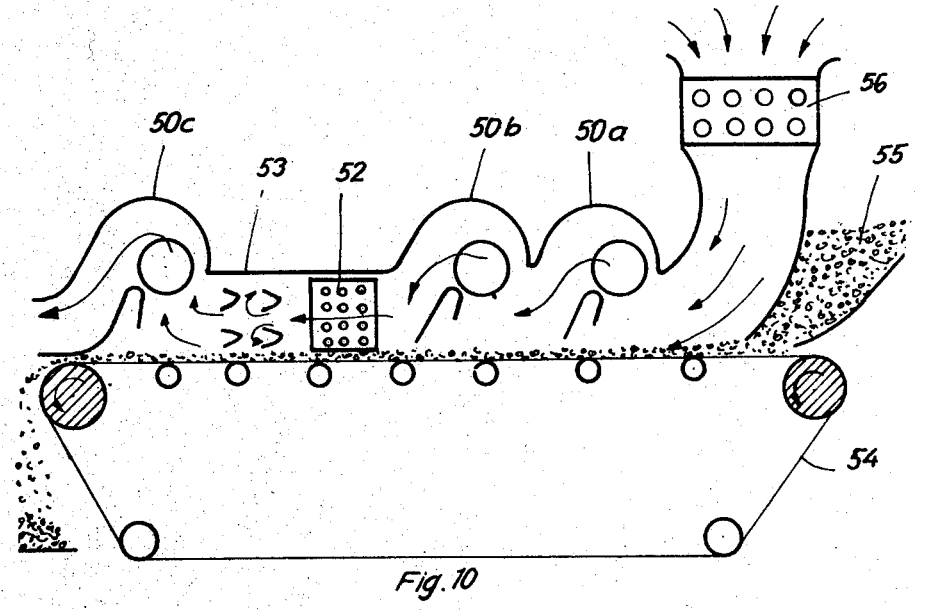

In the arrangement according to FIG. 9, so-called turbulence ducts $48a$, $48b$ approximately as shown in FIG. 7, are fitted between the individual blower units $46a$, $46b$, $46c$, $46d$, for heating the web 47. The entering air is heated at 49. In the arrangement according to FIG. 10, a heat exchanger 52 and a turbulence duct 53, are arranged between the cross-flow blower units $50a$, $50b$ and $50c$. The conveyor belt carrying the material to be dried 55 on its surface, is shown at 54. The entering air is heated at 56. In the arrangement according to FIG. 11 the web before running on to the heating drum, passes through a heating element in which it is exposed to the influence of a number of successive and coacting cross-flow blower units, a turbulence duct 58 being arranged between each two, successive cross-flow blower units $57a$, $57b$. This heating section contains at least four such cross-flow blower units; the web is run over rollers 59. Between the heating section and the heating drum, a heat exchanger 60 is fitted, for heating the entering air and/or the web to be heated. The arrangement is such that the temperature at the entry of the heating section is about 30°, and in the region of the heat exchanger, 60, about 50°. In the region of the heating drum, heating can be effected by any known means, such as an oil bath, to a temperature of about 80°. In addition, in the exemplary embodiment shown, the arrangement can be such that in this region already 60% of the moisture is abstracted from the materials. The turbulance ducts in the heating section have the further purpose of preventing fluttering of the materials. The turbulence ducts in the heating secing films or the like with light-sensitive emulsions, may prove very disturbing. The figures and conditions given above are, however, merely exemplary, since the number of blower units and heat exchangers as well as the selected temperatures will depend on the throughput rate, the nature of the material, the circumference of the heating drum, the kind of operation to be performed, etc.

A form of embodiment of the object of the invention not shown in the drawing can be used for cooling plastic foil and sheet as issuing from the spreader nozzle in production. In this arrangement the foil issues from the nozzle on to the circumference of a drum running at uniform speed in the direction of travel of the foil and carrying a number of cross-flow blower units arranged as described above in such a manner that the air discharged from the exit of the one blower is drawn into the entry of the next following blower unit. Heat exchangers can be fitted between the individual blowers, the arrangement being such that the air blown from the blower discharge on to the surface of the foil is taken up by the following heat exchanger in which the heat absorbed by the foil surface is again removed. Thereafter this air, possibly after making further contact with the surface of the foil, is directed to the entry side of the next following blower unit.

In the arrangement according to FIG. 12 two blowers, e.g. cross-flow blowers 65, 66 are fitted the discharges of which open into an interposed channel or duct, the two, axial ends of which are each controlled by a periodically (intermittently) working closure element 67, 68, e.g. a pivoting flap, reciprocating in opposite directions to open and close the duct. In the form of embodiment according to FIG. 13, one cross-flow blower 69 is provided, the discharge whereof opens into a channel or duct 70 the inlet whereof is controlled by a periodically-acting closure 71 in the form of a pivoted flap valve which reciprocatingly opens and closes the opening. Between the blower and the surface of the process material a rotating baffle system on an axis perpendicular to the surface of the process material can be fitted, comprising a plurality of radially arranged baffle plates or partitions, between which passages are formed for the admission and discharge of the air. In this arrangement it is further possible to make the blower and the upstream baffle assembly associated therewith, perform reciprocating motions in the direction parallel to the surface of the process material.

In the arrangement according to FIG. 14 the device is assembled in building-block fashion from prefabricated units 75 each contained in a housing 76 and having on the side facing the surface 77 of the process material a number of cross-flow blowers $78a$, $78b$, $78c$ with spoilers 79 between them and their axes parallel with each other and with the surface of the process material, with a booster blower 80 promoting the circulation in the system, and on the side farthest from the surface of the process material a heat exchanger 81, the inlet 82 for the fresh air being located at one end of the blower axis, and the outlet for the spent air 83, at the other end thereof.

Finally, it is also possible to make the flow formed by the issuing air jets, unsteady over its width.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A method for drying or heating or cooling process material comprising in combination: passing the material in the form of a band or web or of an approximately uniformly thick layer or film carried on such band or web through a treatment chamber, exposing the surface of the said process material within said chamber for a predetermined time to the action of a current of air or jets or air, whereby the said air jets are made to impinge on the surface of the said process material and thereby form a flow travelling along the surface of the process material and whereby this flow is repeatedly interrupted on its course and thereupon re-formed suitably by producing an instability in such flow or introducing spoiling means thereinto.

2. The method set forth in claim 1, wherein on the one hand the boundary layer formed in the flow along the surface of the process material is destroyed and on the other hand a carrier flow is allowed to form facilitating an exchange of substance and heat between the surface of the said process material and the ambient space, such operation of forming and ensuing destruction of the said boundary being performed intermittently along the surface of the process material at suitably equal time intervals.

3. The method set forth in claim 1, wherein the air is discharged on to the process material in the form of an unsteady flow with highly spheroidal or vortical turbulence in such manner that the formation of a laminar boundary flow along the surfaces of the process material is reliably prevented.

4. The method set forth in claim 1 wherein the flow produced by the issuing air jets is made unsteady by altering the direction or interrupting the flow or like means.

5. The method set forth in claim 1, wherein during the passage of the process material through the treatment chamber the air is discharged on to the surface thereof in the form of jets issuing directly from a blower of the cross-flow type without the intermediary of nozzles.

6. The method set forth in claim 1, wherein each of the suitably regular intervals along the surface of the process material an air jet from a cross-flow blower is projected on to the surface to be treated and within each area between two successive points where such an air jet impinges on the said surface, by producing a suitable plurality of vortices, e.g. by introducing flow spoilers and obstacles, turbulence is generated in the outflowing boundary layer or an already existing turbulence therein intensified or at least maintained.

7. The method set forth in claim 1, wherein at each point where a boundary layer has thus been formed, the air in the boundary layer is drawn off at a short distance from the point of impact of the air jet on the surface of the process material.

8. An arrangement for performing the process set forth in claim 1, wherein a cross-flow blower is provided with its axis parallel to the surface of the process material which discharges an air blast on the surface of the said process material without the intermediary of nozzles or the like and that the nearest point on the periphery thereof to the said surface of the process material is located at a distance from the latter not exceeding the diameter of the blower rotor and preferentially at a shorter distance therefrom.

9. An arrangement for performing the process set forth in claim 1, wherein there is provided a blower discharging directly without the intermediary of nozzles or the like on the surface of the process material and suitably a cross-flow blower with its axis parallel to the surface of the material to be dried, the discharge whereof communicates with a duct parallel to the surface of the process material and at right angles to the axis of rotation of the blower running along the surface to be treated and the inlet whereof is controlled by a periodically or intermittently acting closure element such as a pivoting flap valve which performs a reciprocating, opening and closing motion.

10. An arrangement for performing the process set forth in claim 1, wherein there is provided a series of cross-flow blowers suitably spaced along the length of the process material with their axes parallel to the surface thereof and the discharges whereof open into a duct parallel to the surface to be dried and at right angles to the axes of rotation of the said blowers arranged at the ends of the axis thereof and which runs along the length of the said process material each end whereof is controlled by a periodically acting closure element such as a pivotable flap valve which in reciprocating motion alternately opens and closes the said duct.

11. An arrangement for performing the process set forth in claim 1, wherein there is provided at least one blower such as a cross-flow blower between the discharge whereof and the processed surface a baffle element is arranged so as to be rotatable about a vertical axis perpendicular to the said process surface and incorporating a plurality of partitions or baffles between which passages are formed for the admission of air.

12. The arrangement set forth in claim 8, wherein a suitable number of prefabricated elements assembled in building-block fashion are provided each containing in a casing or housing a number of cross-flow blower elements discharging directly without interposition of a nozzle or the like on to the surface of the process material the axes whereof are mutually parallel and parallel with the said surface of the process material, a booster blower for maintaining the circulation in the system and on the side farthest from the surface of the process material a heat exchanger while a fresh-air inlet is suitably provided at one end of the axis each such unit and a spent-air outlet similarly arranged on the other end of the said axis, whereby there may be arranged between the cross-flow blowers of each unit spaced along the length of the process surface spoilers of approximately triangular cross-section the apex whereof is in each case pointed towards the incident flow.

13. The arrangement set forth in claim 8, wherein the individual cross-flow blowers are constructed in the form of so-called high-stability cross-flow blowers with a guide plate or baffle extending in the direction of rotation from the rotor entry to the rotor outlet progressively curving away from the periphery of such rotor with an angle between the entry tangent and the end tangent substantially less than 90° suitably within the range of 30–60° and with a vortex tongue or spoiler covering the least possible part of the rotor periphery with two sides enclosing between them an acute angle of suitably 20–60° the suction side forming with the rotor blade cascade a gap widening in the direction of rotation the said rotor being associated with flow-guiding means forming at least one reflux channel or duct converging from the pressure side towards the suction side and through which a part of the air flow issuing from the rotor is directed backwards approximately tangentially to the periphery of the rotor.

14. The arrangement set forth in claim 8, wherein between each two, adjacent blower units for instance in each case at least one heat exchanger for preheating the process air is provided and in each such case a so-called turbulence channel is provided between the surface of the process material and a wall part parallel therewith in which spoilers and flow guides are arranged along the length and suitably also the width thereof for the purpose of generating pairwise alternating vortices, the said spoiler elements being suitably of triangular cross-section with the apex facing the incident flow.

References Cited

UNITED STATES PATENTS

| | | | |
|---|---|---|---|
| 1,595,478 | 8/1926 | Minton | 34—16 |
| 2,083,423 | 6/1937 | Bennett | 34—23 |
| 2,144,919 | 1/1939 | Gautreau | 34—23 |
| 2,351,549 | 6/1944 | Schwartz | 34—23 |
| 2,838,420 | 6/1958 | Valente | 34—23 |
| 3,176,412 | 4/1965 | Gardner | 34—122 |

WILLIAM J. WYE, Primary Examiner

U.S. Cl. X.R.

34—22, 49, 148; 230—125